United States Patent
Hett et al.

(10) Patent No.: US 7,084,371 B2
(45) Date of Patent: Aug. 1, 2006

(54) JOINING SYSTEM FOR JOINING ELEMENTS ONTO COMPONENTS, METHOD OF OPERATING A JOINING SYSTEM AND DATA MEMORY

(75) Inventors: Uwe Hett, Schrecksbach (DE); Keith Glover, Shelby, MI (US)

(73) Assignee: Newfrey LLC, Newark, DE (US)

( * ) Notice: Subject to any disclaimer, the term of this patent is extended or adjusted under 35 U.S.C. 154(b) by 156 days.

(21) Appl. No.: 10/762,089

(22) Filed: Jan. 21, 2004

(65) Prior Publication Data
US 2004/0149694 A1    Aug. 5, 2004

Related U.S. Application Data

(63) Continuation of application No. PCT/US02/22829, filed on Jul. 17, 2002.

(30) Foreign Application Priority Data
Jul. 23, 2001    (DE)    ................................ 101 36 994

(51) Int. Cl.
 *B23K 9/95*    (2006.01)
(52) U.S. Cl. ...................... 219/130.5; 219/98
(58) Field of Classification Search ............. 219/130.5, 219/130.1, 132, 98, 99
See application file for complete search history.

(56) References Cited

U.S. PATENT DOCUMENTS

| 4,415,792 | A | * | 11/1983 | Jordan ......................... 219/98 |
| 4,503,310 | A | * | 3/1985 | van Loon ..................... 219/98 |
| 4,804,811 | A | | 2/1989 | Raycher et al. |
| 5,208,436 | A | * | 5/1993 | Blankenship ............ 219/130.1 |
| 5,278,390 | A | | 1/1994 | Blankenship |
| 6,552,303 | B1 | * | 4/2003 | Blankenship et al. ..... 219/130.5 |
| 6,563,085 | B1 | * | 5/2003 | Lanouette et al. ........ 219/130.5 |
| 6,627,849 | B1 | * | 9/2003 | Ihde et al. ............... 219/130.5 |

FOREIGN PATENT DOCUMENTS

DE    198 28 986 A1    12/1999
WO    WO 98 34751 A1    8/1998

* cited by examiner

*Primary Examiner*—Clifford C. Shaw
(74) *Attorney, Agent, or Firm*—Harness, Dickey & Pierce, P.L.C.

(57) ABSTRACT

Proposed is a joining system (10) as well as a method of operating a joining system (10) for joining elements (20) onto components (22), in particular for the short-time arc welding of elements (20), such as metal studs (20), onto components (22), such as metal sheets (22), having a central unit (12), which comprises a control device (30) and connectable to which is at least one joining unit (14) from a selection of different joining units, each of which comprises at least two modules (16, 18). The control unit (30) is designed so as to recognise (S16, S28) the mutual compatibility of the at least two modules (16, 18) of a connected joining unit (14) as well as the compatibility of the connected joining unit (14) with the central unit (12).

38 Claims, 3 Drawing Sheets

JOINING SYSTEM FOR JOINING ELEMENTS ONTO COMPONENTS, METHOD OF OPERATING A JOINING SYSTEM AND DATA MEMORY

CROSS-REFERENCE TO RELATED APPLICATIONS

This application is a continuation of PCT/US02/22829, filed Jul. 17, 2002, which claims priority to German patent application DE 101 36 994.8, filed on Jul. 23, 2001, which are incorporated herein by reference.

BACKGROUND AND SUMMARY OF THE INVENTION

The present invention relates to a joining system for joining elements onto components, in particular for the short-time arc welding of elements, such as metal studs, onto components, such as metal sheets, having a central unit, which comprises a control device and connectable to which is at least one joining unit from a selection of different joining units, each of which comprises at least two modules.

The present invention further relates to a method of operating such a joining system. Finally, the present invention relates to a data memory, in which is stored software for effecting said method. Such a joining system and such a method of operating a joining system are generally known.

The term, joining, in the present context is to relate to all types of connection of elements to components, in particular connections of metal elements to metal components, for example by reshaping, such as riveting, or by material combining, such as welding, including short-time arc welding. Short-time arc welding is frequently referred to as stud welding, although it is not exclusively studs which are welded. A current stud welding system in industrial use is known from the brochure "Neue Tucker Technologie. Bolzenschweißen mit System!". [The stud welding system], Emhart TUCKER, 9/99. Stud welding is used mainly, but not exclusively, in the field of automotive engineering. There, metal elements, such as metal studs, with and without a thread, eyes, nuts etc., are welded onto the vehicle body panel. The metal elements then serve as anchors or fastening elements for fixing, for example, interior fittings.

In the case of the above-mentioned stud welding according to TUCKER, first of all an element is inserted into a welding head. This may be effected by an automatic feed device, for example by means of compressed air. The welding head then positions the element at the appropriate location on the component. Next, a preliminary current is switched on, which flows through the stud and the component. Then the element is lifted relative to the component by means of a lifting apparatus. An arc is formed. The arc current is selected in such a way that impurities, surface coatings, zinc, oils etc., are initially burnt away. There is then a switchover to the welding current. As a result of the high welding current the mutually opposing ends of the element and component start to melt. The element is then lowered back onto the component so the mutual melts intermingle. Upon reaching of the component and the short circuit of the arc, or shortly beforehand, the welding current is switched off. The melt solidifies and the weld joint is complete.

The previously mentioned stud welding system according to TUCKER comprises a central unit, to which up to five welding units are connectable. Each welding unit comprises a feed module and at least one welding module. The connection of the welding units to the central unit is effected by connecting the respective feed module to the central unit. Either one welding module is directly connected to the feed module. Alternatively, two welding modules may be connected, via a distributing guide, to the feed module. The welding modules may be welding heads, which are mounted either rigidly or movably, for example on a robot. A welding module may however alternatively take the form of a welding gun manipulatable by an operator.

In the known system, the central unit contains a power supply device, which substantially comprises a current source for providing a welding current. The central unit further comprises a control device, which controls the operation of the central unit itself as well as the welding units connected thereto. The feed modules each comprise a separate control device, which control devices are connected to the control device of the central unit by signal lines, for example in the form of optical fibres. The feed module and the welding modules connected thereto are also connected to one another by signal lines. As a result, the control device of the central unit is able to control the run-off of welding operations for all of the connected welding units. It goes without saying that the power supply lines are looped through from the power supply device of the central unit up to the respective welding modules. The feed modules further comprise a pneumatic assembly, which as a rule cooperates with an isolating device for feeding elements, which are to be welded, in an isolated manner to a connected welding module.

Different welding units are connectable to the central unit. The welding units differ from one another, first of all, in the shape of the respective elements to be welded on, whether they are studs, threaded studs, T-studs etc. Furthermore, there are differences in terms of the material, for example steel or aluminium. Moreover, there are also welding modules for producing circular weld seams for the welding-on of, for example, nuts. The welding method is referred to as MAC (magnetic arc control) welding. As already mentioned above, there are different welding modules, for example mountable welding heads and manipulatable welding guns.

For each individual process, for example steel welding of earthing studs, there is special process software. The process software is adaptable by means of freely programmable parameters to special circumstances. The process software for connected welding units is filed in an EPROM memory of the control device of the central unit.

The welding modules in the past had lifting apparatuses based on an electromagnet/spring system. Newer generations of welding modules have electric linear motors as lifting apparatuses. Welding modules having both types of lifting devices may be connected to some feed modules. Other feed modules, in particular older feed modules, on the other hand are designed exclusively for the connection of welding modules having electromagnet/spring lifting apparatuses.

From all of the above it is evident that there are many possible ways of combining welding modules, feed modules and process software. Even when the manner in which the welding system is currently configured is displayed on a display apparatus for a user, a high degree of error susceptibility still exists for incorrect configurations.

The object of the invention is to indicate a joining system for joining elements onto components, in particular for the short-time arc welding of elements onto components, as well as an associated method of operating a joining system and a data memory with software for effecting the method, with which the error susceptibility is markedly reduced. The object is achieved in the case of the joining system described at the outset in that the control device is designed so as to recognise the mutual compatibility of the at least two modules of a connected joining unit as well as the compatibility of the connected joining unit with the central unit. The object is further achieved by a method of operating a joining system for joining elements onto components, in particular for the short-time arc welding of elements, such as metal studs, onto components, such as metal sheets, wherein the joining system comprises a central unit with a control device and wherein there is connectable to the central unit at least one joining unit from a selection of different joining units, each of which comprises at least two modules, having the step of recognizing the mutual compatibility of the at least two modules of a connected joining unit and/or the compatibility of the connected joining unit with the central unit. Finally, the above object is achieved by a data memory, in which software for effecting the method is stored.

By virtue of the fact that the compatibility of the two modules of a connected joining unit is recognisable, it is possible to avoid configuration errors, and in particular configuration errors which might lead to a mutual destruction of modules or a destruction of the central unit. The control device is namely capable of recognising whether, for example, a welding module connected to a feed module does actually match the feed module. In a similar manner configuration errors with regard to the configuration of the central unit, on the one hand, and a connected joining unit, on the other hand, may be avoided. Recognition of the compatibility is effected by the control device, which carries out the recognition steps in accordance with the method according to the invention. Insofar as said method is implemented as a program, a data memory having such a program stored therein also forms a refinement of the present invention.

Preferably, the control device is programmable, and the control device is further designed so as to recognise the compatibility of the connected joining unit with the programming of the control unit. Given the refinement, it is possible further to increase the operational reliability.

In particular, it is preferred to employ a control device comprising a memory, in which is stored at least one type of process software, which is used to control at least one type of connected joining unit. It is consequently advantageous when the control device recognises the compatibility of the connected joining unit with the programming of the control device in that the control device checks whether the stored type of process software is compatible with the type of connected joining unit. In this manner, a high degree of operational reliability combined with extreme versatility of the joining system may be achieved.

According to a further preferred form of construction, the control device comprises a memory, in which is stored a plurality of types of process software, which respectively are used to control at least one type of connected joining unit. In this manner, the versatility of the joining system is further increased because different types of joining units are connectable without having to reconfigure the central unit. In this case, it is particularly preferred when the control device, in dependence upon the connected type of joining unit, selects from a plurality of types of process software the type, which is compatible with the connected joining unit, for operation. In this manner the operation and, in particular, the selection of the "correct" process software may be automated. Accordingly, the operational reliability is increased even further.

According to a particularly preferred embodiment, access to at least one type of stored process software is generally disabled but may be enabled by means of a code. This aspect is regarded as a separate invention, independently of the above-mentioned compatibility checks between modules of the joining unit and the joining unit and the central unit. By virtue of this measure it is possible to store in the memory a plurality of types or all different types of process software, but upon selling of the system it is possible to disable access to a part of the stored process software. This means that for the control device the disabled type of stored process software is regarded as non-existent. It is only through entry of a code that said type of stored process software may then be enabled. Only with enabling is said type of process software available for operation. During a compatibility check between connected joining unit and the stored types of process software, only enabled process software is considered. In other words, the compatibility check may produce a negative result, even when compatible process software is stored. This is the case when said process software is still disabled. By virtue of this measure it is possible to store all types of process software for all versions of joining systems but disable access to at least some types of process software. Individual types of process software may then be enabled by entering codes which are suitable in each case. Thus, on the whole, the reconfiguration effort is reduced.

According to a further preferred embodiment, a previously defined process parameter block type exists for each type of process software. The types of parameter blocks may differ depending on the type of process software. Many parameters are contained in one type of parameter block, others not. In this case, it is particularly preferred for each type of stored process software, a plurality of parameter blocks of the same type are stored in a memory of the control device. In this manner it is possible to operate one and the same type of process software differently by means of different parameter blocks in order to be able to take account of requirements which differ from welding operation to welding operation.

It is moreover of particular advantage when the control device in dependence upon the connected type of joining unit selects a parameter block type and offers programming exclusively of the parameters which are contained in the selected parameter block type. In this manner the programming for individual welding locations of a specific type of process software may be simplified. In particular, the repeated polling of parameters, which are not contained at all in the parameter block type, is prevented during the programming of parameter blocks of the same type for successive welding operations within an overall process. In the prior art on the other hand, every single parameter is polled during the programming of the parameters for each welding operation.

According to a further embodiment, in the course of operation the control device at intervals repeats the process of recognition of the mutual compatibility of the at least two modules of a connected joining unit as well as the compatibility of the connected joining unit with the central unit. It is thereby guaranteed that an incorrect configuration is recognised even if in the course of operation a welding module, for example, is exchanged.

On the whole, it is also preferred when the modules of a joining unit are connected to one another. This is the case, for example, in the known welding system according to TUCKER, as mentioned at the outset. Furthermore, it is particularly preferred when one of the two modules is connected to the central unit and the module, which is connected to the one module, is recognisable via the one module in the control device of the central unit. In other words, given this form of construction, despite the "serial" interconnection of the two modules, of which only one is connected to the central unit, it is possible to recognise both modules. For this purpose, signal lines are preferably provided between the modules and between the one module and the central unit. Recognition is effected by a communication between the units and/or modules by means of suitable protocols via the signal lines.

It is further preferred when the two modules of a joining unit are a feed module and a joining module, wherein the feed module is designed so as to feed elements to be joined to the joining module, and wherein the joining module is designed so as to effect a joined connection of an element, which respectively is fed, to a component. In particular, it is preferred when the two modules are a feed module and a welding module for short-time arc welding. In this case it is particularly preferred when the feed module is designed so as to supply two joining modules with elements to be joined. A distributing guide may be provided between the feed module and the joining modules for this purpose.

On the whole, it is moreover preferred when the memory of the control device is a flash memory. In this manner, large data quantities, for example including all types of process software, may be permanently stored and the data are maintained even in the event of disconnection of the power supply. Furthermore, a flash memory may be reprogrammed comparatively easily. For this purpose, it may be advantageous to provide on the central unit an interface for the connection of a computer, for example a notebook. It is self-evident that the features described above and yet to be described below are usable not only in the combination indicated in each case but also in other combinations or independently without departing from the scope of the present invention.

BRIEF DESCRIPTION OF THE DRAWINGS

Embodiments of the invention are illustrated in the drawings and described in detail below. In the drawings.

DETAILED DESCRIPTION OF THE PREFERRED EMBODIMENTS

Figure 1:
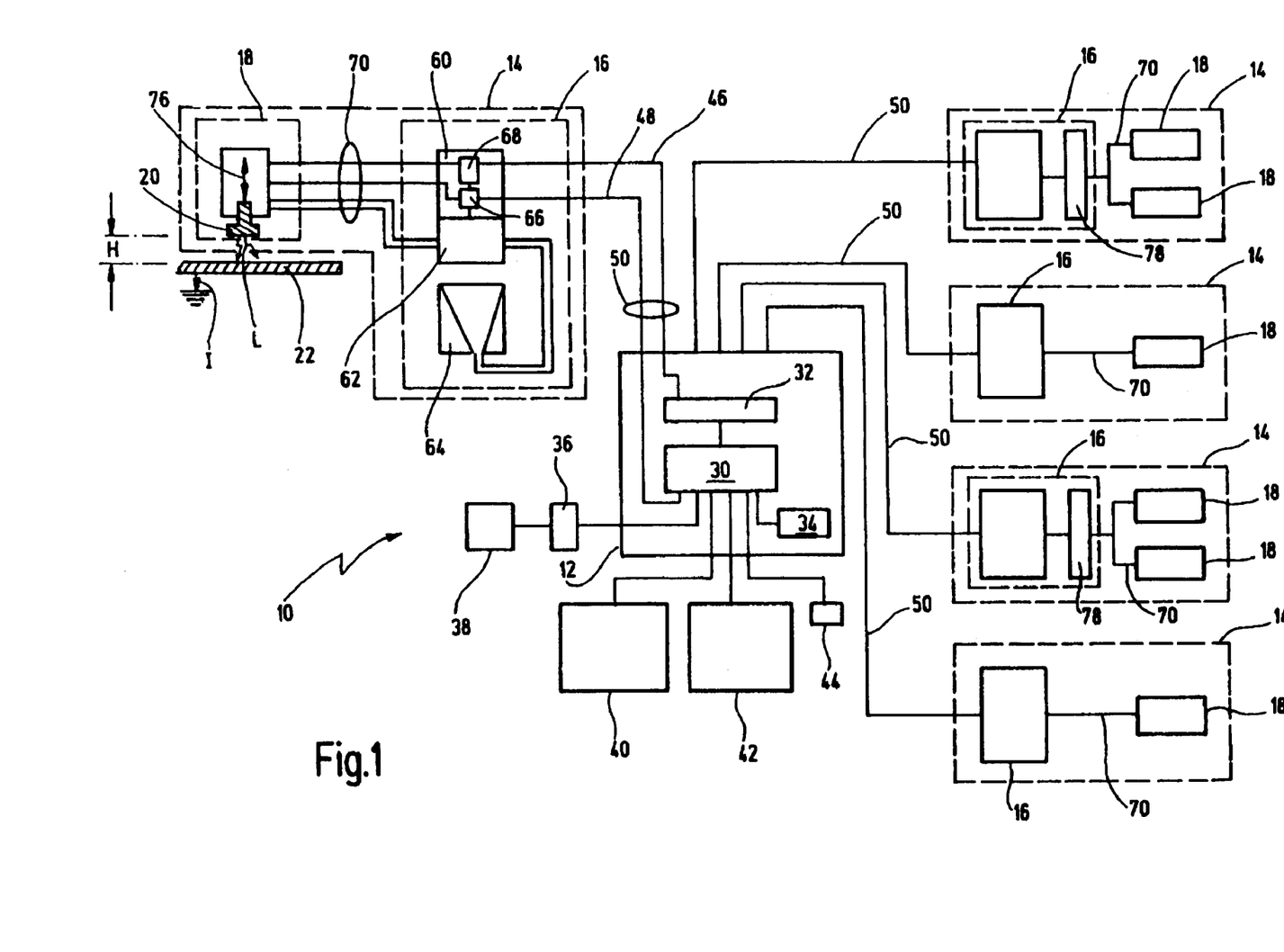
FIG. 1 is a block diagram of an embodiment of a welding system according to the invention.

In FIG. 1 an embodiment of the joining system according to the invention in the form of a short-time arc welding system is generally denoted by 10. The short-time arc welding system 10, hereinafter abbreviated to stud welding system, comprises a central unit 12, to which a plurality of welding units 14 (typically five) are connectable. The welding units 14 take the form of stud welding units 14. However, it goes without saying that the present invention is not restricted to stud welding systems but is intended to cover all joining systems. Subsequent references to welding systems, welding, stud welding etc., are therefore in the present context to be generally understood in such a way that they may also mean other joining systems.

The stud welding system 10 is designed for industrial use and is typically employed in the field of automotive engineering. Here, the stud welding system, or a plurality of such stud welding systems 10, is used to weld connecting elements, such as metal studs with or without a thread, eyes, nuts etc., onto vehicle body parts. The connecting elements serve as anchors for fastening, for example, interior fittings of the motor vehicle. It goes without saying, however, that the field of application of the stud welding appliance 10 is not restricted to the above.

Each welding unit 14 comprises a feed module 16 and at least one welding module 18. The feed module 16 is used to feed metal elements 20, such as metal studs with or without a thread, eyes, nuts etc., in an isolated form to the welding module 18. Then in the welding module 18, in the course of a welding operation, one respective metal element 20 is welded onto a metal sheet 22. Such a stud welding system 10 is known in principle from the prior art and is described in detail in brochure "New TUCKER Technology. Systematic Stud Welding!" cited at the outset, the disclosure of which is presently to be contained in full by reference.

Generally a welding operation with the stud welding system proceeds as follows. First, an element 20 is fed by means of the feed module 16 to the welding module 18. The welding module 18 places the element 20 onto the component 22 such that an electrical contact arises. Then a so-called preliminary current is switched on. Shortly afterwards the element 20 is lifted relative to the component 22 until a welding stroke height H is reached. During this time the preliminary current remains switched on. During lifting of the element an arc is drawn. The preliminary current arc has enough energy to burn away and/or vaporise any impurities, coatings, zinc etc. in the region of the welding location.

After attainment of the welding stroke height H, a welding current I is connected to the system, the element 20 and the component 22 start to melt in the region of the drawn arc (diagrammatically illustrated by L) by means of the high welding current I of approximately 20 A to 1,500 A for example. The lowering operation is then initiated. The element 20 is lowered until it encounters the component 22. At or shortly before the instant the welding current I is switched off. The molten material solidifies. The element 20 is connected by a weld joint to the component 22. All of this takes place within welding times of approximately 6 ms to 200 ms.

The central unit 12 comprises a control device 30 and a power supply device 32. The power supply device 32 may take the form of a constant-current source and supplies the above-mentioned preliminary current and welding current 1. The control device 30 comprises a non-volatile memory 34, in particular a flash memory 34. An interface 36 for a parameter memory is further provided on the control device 30. A parameter memory 38 is detachably connected to the interface 36. The parameter memory 38 may, for example, take the form of a RAM card packed into a flat housing with a PCMCIA interface. The control device 30 further comprises an interface for the connection of a computer, in particular a notebook 40. An operator terminal 42 is also connected to the control device 30, and a customer interface 44 is provided so as to allow the stud welding system 10 to be integrated into a total industrial process.

The connection between the central unit 12 and a welding unit 14 is effected, on the one hand, by a signal line 48 and, on the other hand, by a power line 46. The power line 46 carries the current from the power supply device 32. The signal line 48 is used for communication between the control device 30 and the welding unit 14. The signal line 48 and the power line 46 are, as a rule, combined in a single power train 50.

The feed module 16 comprises an electronic assembly 60 and a pneumatic assembly 62. Associated with the pneumatic assembly 62 is an isolating device 64. The isolating device 64 is used to receive metal elements 20, which are to be welded on, in bulk form and marshals the metal elements 20 and feeds them via a pneumatic line (not described in detail) to the pneumatic assembly 62. The electronic assembly 60 comprises a feed control 66, to which the signal line 48 is connected. The electronic assembly 60 further comprises a feed power section 68, to which the power line 46 is connected. The feed module 16 is connected by a line train 70 to the welding module 18. The line train 70 comprises firstly a pneumatic line for feeding isolated metal elements 20, as well as a signal line and a power line (not described in detail).

The welding module 18 comprises a lifting device 76. The lifting device 76 is used to lift the metal element 20 relative to the metal sheet 22 and lower it again. The lifting device 76 may be formed either by a combination of an electromagnet and spring or by an electric linear motor. As is shown on the right hand side in FIG. 1, two welding modules 18 are connected, namely by a distributing guide 78, to several feed modules 16.

As is evident from the above, the stud welding system 10 is of a modular design. Owing to the modular style of construction there are a great many possible configurations. For example, one welding module 18 may have a magnet/spring lifting apparatus, and another a linear motor lifting apparatus. Furthermore, one welding module 18 may be a mountable welding head, while another of the five welding units may be a manipulatable welding gun. Many feed modules 16 are designed for the connection of every type of welding module 18. To other feed modules 16 only a specific type of welding module 18 may be connected.

Moreover, both welding modules 18 and feed modules 16 differ in terms of the type and material of the element 20 to be welded on. In terms of shape, a distinction is made substantially between studs (with and without a thread, Christmas-tree studs, earthing studs etc.), T-studs and metal elements 20 which are to be welded on by means of magnetic arc deflection. In terms of material a distinction is made substantially between steel and aluminium. There is also the possibility of combining the welding operations with a cleaning process.

For control of the wide variety of welding units 14 (with a wide variety of combinations of feed modules 16 and welding modules 18), substantially five different process software types are filed in the memory 34 of the control device 30, which are denoted by A, B, C, D and E and briefly explained in the following table.

TABLE 1

| A | Steel stud welding | Standard welding method; stud is applied with specific force; welding current disconnected when stud meets component |
|---|---|---|
| B | Aluminium stud welding | Special welding method; stud is applied with specific force; welding current disconnected before stud meets component |
| C | T-stud welding | Special welding method; stud is not applied with specific force but moved into a specific position; welding current disconnected before stud meets component |
| D | MAC welding | Special welding method with magnetic arc deflection; stud is applied with specific force; welding current is limited, welding time lengthened; disconnection before stud meets component |
| E | Cleaning | Additional method for A, B, C or D; |

TABLE 1-continued

| | |
|---|---|
| process | either before welding with large stroke, low current, or during welding operation by means of current peaks |

Substantially all possible configurations of welding units 14 may be controlled with the five process software types.

Figure 2:
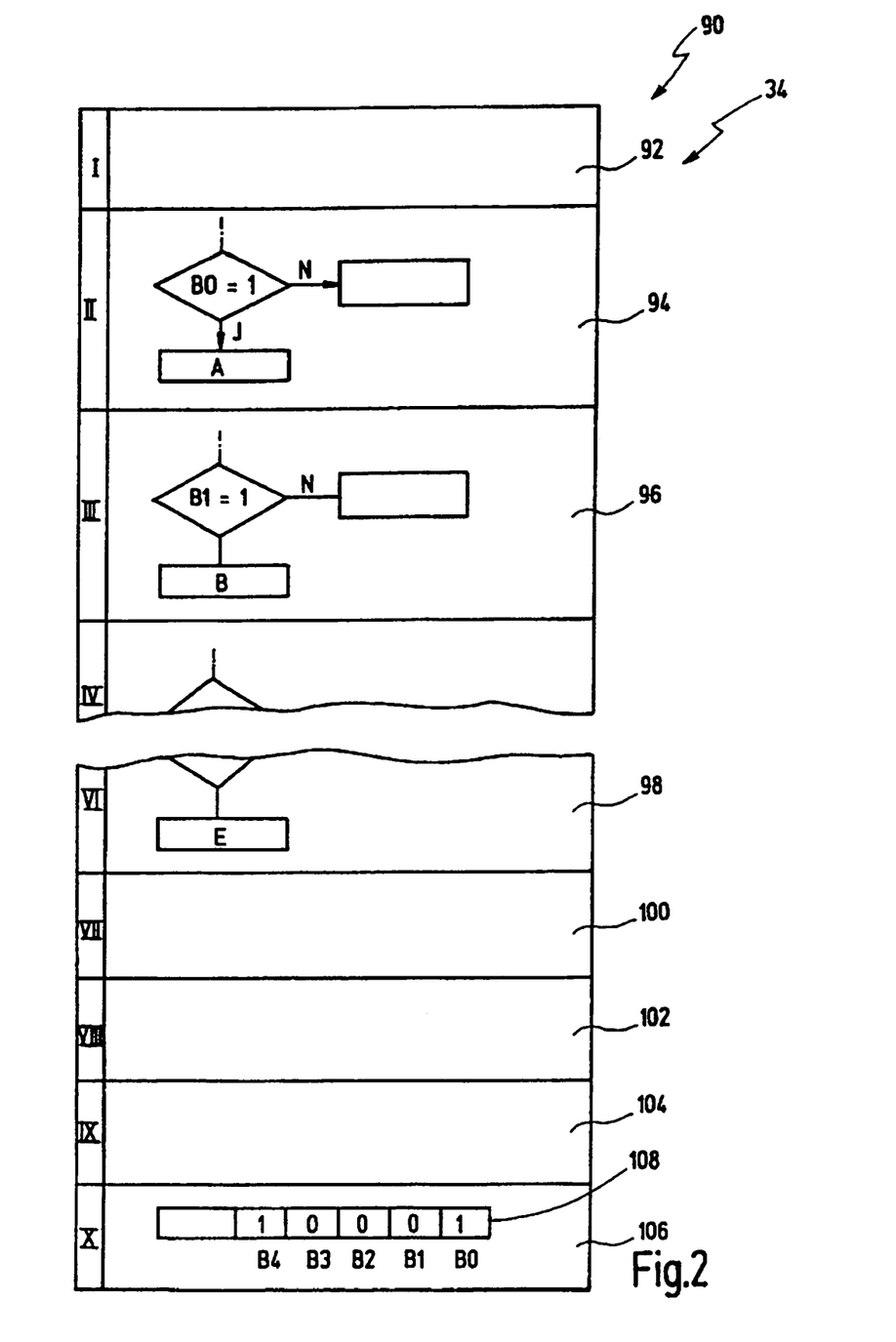
FIG. 2 is a diagrammatic view of a possible embodiment of the organization of the memory of the control device of the central unit of the joining system.

The organization of the memory 34 is illustrated in FIG. 2 by way of example in the form of a schematic diagram 90. The memory 34 has at least ten memory sectors I–X which are occupied by different software modules, as is explained below. It goes without saying that the individual software modules may generally be in any order and in any relative arrangement. The following description is therefore, in this regard, purely by way of example.

In a first sector I of the memory 34 the so-called system software is filed, which comprises the operating system, a configuration tool and safety modules. In sector 11 the process software 94 for the steel stud welding process A is filed. In sector III the process software 96 for the aluminium stud welding process B is filed. In sectors IV and V the process software modules for the T-stud welding process C and for the MAC welding process D are filed. In sector VI the process software 98 for the cleaning process ("Cleanflash")E is filed. In sector VII analysis software 100 is filed, which is used to analyse malfunctions and to determine the frequency of the occurrence of faults.

In sector VIII a communications software module 102 is filed. The latter is used, on the one hand, for internal communication between the control device 30 and the welding modules 18, the feed modules 16 and the power supply device 32. On the other hand, the communications software module 102 provides external communication with the operator terminal 42, the customer interface 44 as well as an external computer 40 (as a rule via Ethernet). The communications software module 102 moreover enables software to be downloaded into and uploaded from the memory 34.

In sector IX a process parameter software module is filed. Filed in the latter are special sequences for effecting, for example, various welding operations successively using a process software module with different parameter assignment (see below). This software module is further used for process supervision.

Furthermore, a code word memory 106 is provided in sector X. The code word memory contains a code word 108 diagrammatically illustrated in FIG. 2. The code word 108 comprises at least five bits B0 to B4. The five bits B0 to B4 are assigned to the five types of process software A–E. From FIG. 2 it may be seen that the bits B0 and B4 are set at "1", the bits B1–B3 on the other hand are set at "0". This means that the process software types A and E are enabled. The process software types B–D, on the other hand, are disabled.

Diagrammatically illustrated in the sectors II and III is a query associated with the respective process software modules A, B. Thus, upon access to the process software module A there is first of all a query as to whether bit B0 of the code word 108 is set at "1" or at "0". Only if the bit B0 is set at "1" is access allowed to said process software type A. Otherwise, an error message is output. Corresponding queries are effected also for the other process software types B–E.

In the present case, the special programming of the code word 108 means that the central unit 12 is configured in such a way that the process software A for steel stud welding and the process software E for the cleaning process are enabled. Consequently, any welding units 14, by means of which the steel stud welding process is effected, may be connected to the central unit 12. What is more, the stud welding process may be combined with a cleaning process. However, the programming of the code word 108 also means that the central unit 12 is disabled with regard to a use of the process software B for the aluminium stud welding process. Should a welding unit 14, which is designed for aluminium stud welding B, subsequently be connected to the central unit 12, the appropriate process software B is not available.

Figure 3:
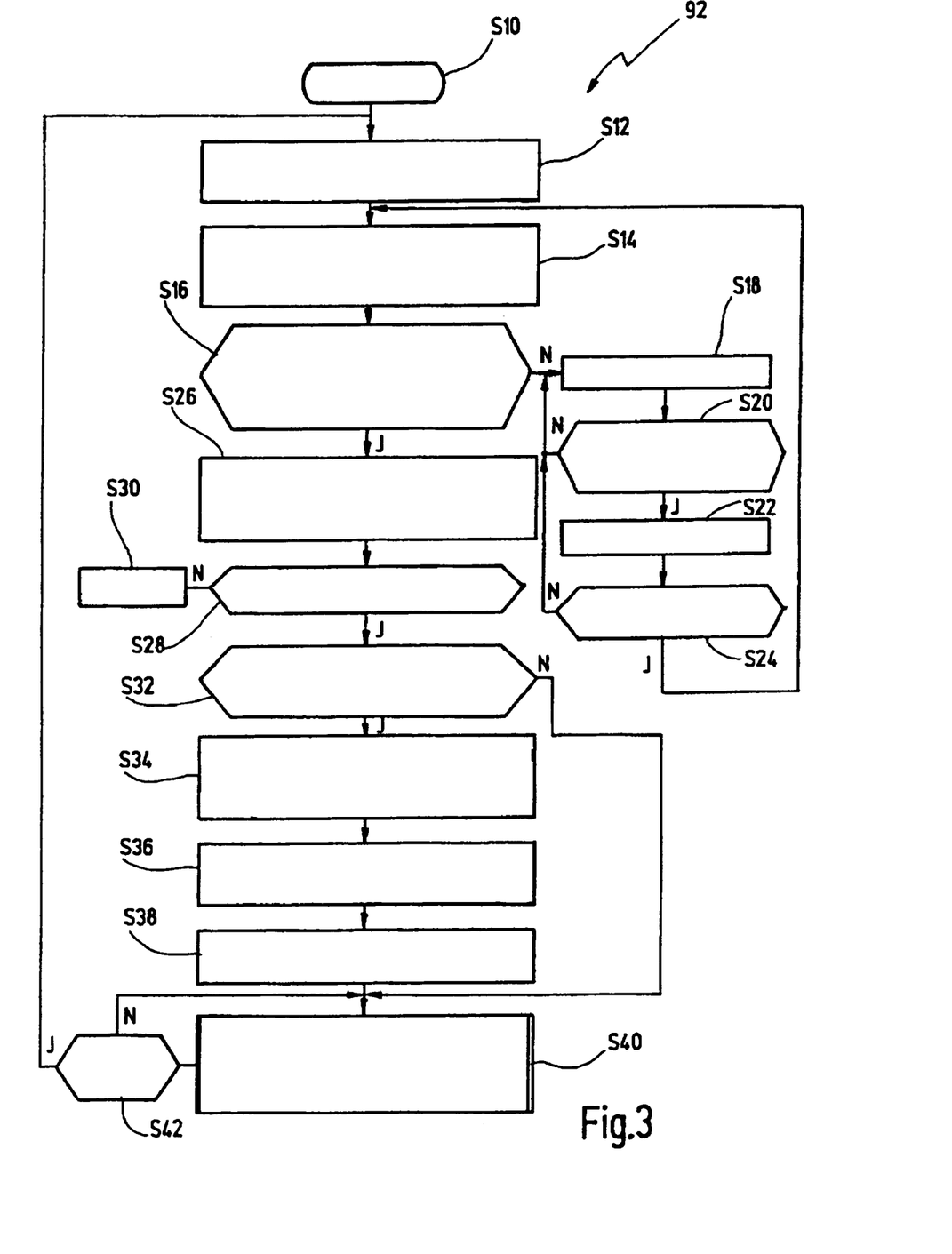
FIG. 3 is a flowchart of an exemplary embodiment of an extract from the system software of the control device.

FIG. 3 illustrates an exemplary way of programming an extract from the system software for configuration of the stud welding system 10. The flowchart 92 shown in FIG. 3 is to be understood as an example and is to be used to gain a better understanding of basic sequences. The order of the individual steps is, however, by no means binding. Rather, it is possible to implement the core method steps, which are contained therein, also in other combinations and in a different order.

Upon polling of the configuration module of the system software 92, a recognition of the connected welding unit (joining unit) 14 is effected first of all in a step S12. In step S12, the type of feed module 16 and the type of welding unit 18 contained in the welding unit 14 are established by suitable queries via the signal line 48 inside the control device 30. There then follows, in step S14, a check of the enabled process software in the control device 30. The check is effected by scanning the code word 108. In the case of the illustration of FIG. 2 it would therefore be recognised in step S14 that the process software types A and E are enabled.

There then follows, in step S16, a query as to whether the connected welding unit 14 is compatible with the enabled process software. Should the welding unit 14, which has been connected, subsequently be used for aluminium stud welding, non-compatibility is ascertained because the process software module B is not enabled. This leads to an error message (step S18) and then optionally to a query as to whether entry of an enabling code is desired (step S20). By this means the possibility is to be afforded of asking the user whether he would possibly like and/or is able to enable the process software B. Should the user know an appropriate enabling code, which is requested in step S22, the accuracy of said code is queried in step S24. If the code is correct, the appropriate bit of the code word 108 (in the present example, the bit B1) is set to "1" and the process software B is therefore enabled. The process then runs through the steps S14 and S16 once more, wherein in said case the query in step S16 leads to a positive result.

The mutual compatibility of the modules of the connected welding unit 14 is then checked (step S26). In this step, suitable queries in the control device 30 are used to check whether the welding module 18 connected to the feed module 16 does actually match the feed module 16. If, for example, the feed module 16 is designed exclusively for control of welding modules 18 with an electromagnet/spring arrangement but the actually connected welding module 18 comprises a linear motor as lifting device 76, the modules 16, 18 are not compatible. The corresponding query (step S28) would therefore lead to an error message (S30).

However, should the modules 16, 18 be mutually compatible, the next stage is a query as to whether parameter blocks are to be programmed (step S32). If the answer is no, the flow goes directly to step S40, in which the process software is automatically selected in dependence upon the connected welding unit 14 and polled (in the present example, the process software B for aluminium stud welding). However, if parameter blocks are to be programmed, in step S34 the parameter block to be programmed is automatically selected in dependence upon the connected welding unit 14. In the present example an aluminium stud welding unit 14 is connected, and so a parameter block type containing parameters which apply to the process is selected. The programming of the selected parameter block is then effected in step S36 by suitable interrogation of precisely the parameters at the operator terminal 42.

The advantage is that the programming does not interrogate all of the existing parameters but only the parameters which are of relevance to the relevant process software (in the present example, B). After one or more parameter blocks for one or more welding operations have been programmed, the parameters are stored in the process parameter software module 104 and/or in the parameter memory 38.

In FIG. 3 at S42 an optional time-out module is diagrammatically illustrated, which during operation of the process software is polled at regular intervals, for example every second or before each welding operation. In a case, after the predetermined period of time has elapsed, the configuration is interrogated once more. The operation then returns to the process software. It follows that the time-out may be realised in the form of an interrupt in order to guarantee that, on returning, the process software is continued in the correct sequence.

What is claimed is:

1. A joining system, comprising:
   a main unit having a control device;
   a joining unit including at least a first module and a second module;
   a plurality of process software each operable to conduct a joining operation for each of a plurality of programmed welding operations;
   a plurality of welding process parameters defined for each of the plurality of programmed welding operations;
   a plurality of parameter blocks each having at least one of the welding process parameters, each parameter block assignable to one of the plurality of welding operations; and
   a program operable to interrogate only selected ones of the plurality of welding process parameters common to selected ones of the parameter blocks defined as a parameter block type and prevent interrogation of remaining ones of the parameter blocks not of the parameter block type;
   wherein the control device operably recognizes a compatibility of at least the first module, the second module and the main unit.

2. The joining system of claim 1, further comprising a series of fastening elements operably secured by the first module.

3. The joining system of claim 2, comprising a welding arc operably provided by the first module wherein the welding arc is operable to weld the fastening elements.

4. The joining system of claim 3, wherein the first module further comprises a lifting device which operably moves each of the fastening elements away from a workpiece to be welded after an initial low current arc is created and then moves each of the fastening elements toward the workpiece after a higher current welding arc has been created by the first module.

5. The joining system of claim 1, wherein the main unit comprises a non-volatile memory accessible by the control device.

6. The joining system of claim 5, wherein the non-volatile memory comprises a flash memory containing blocks of software programs.

7. The joining system of claim 6, further comprising:
a random access memory accessible by the control device;
an operator terminal connected to the control device, the operator terminal allowing manual operator control of the control device; and
the plurality of welding process parameters being stored in the random access memory.

8. The joining system of claim 1, further comprising:
operating system software;
first process software operable to control a first welding process for a first fastening element;
second process software operable to control a second welding process for a second fastening element having a different characteristic than that of the first welding process;
analysis software; and
communications software;
wherein each of the software is accessible by the main unit.

9. The joining system of claim 8, comprising:
a steel material for the first fastening elements wherein the first process software operably controls welding of the first fastening elements; and
an aluminium-based material for the second fastening elements wherein the second process software operably controls welding of the second fastening elements.

10. The joining system of claim 8, comprising:
a first shape of the first fastening elements wherein the first process software operably controls welding of the first fastening elements; and
a second and different shape of the second fastening elements wherein the second process software operably controls welding of the second fastening elements.

11. The joining system of claim 8, further comprising a process parameter block stored in a memory accessible by the control device for each of the first and second process software.

12. The joining system of claim 11, wherein each of the first and second process software operably controls an arc welding process.

13. The joining system of claim 1, wherein the first module of the joining unit is a first welding module and the second module of the joining unit is a fastener feeding module.

14. The joining system of claim 13, further comprising a plurality of fasteners, wherein the joining unit further includes a second welding module, the fastener feeding module operably supplying the fasteners in a pneumatic manner to both the first and second welding modules.

15. The joining system of claim 1, further comprising:
a metallic fastening element; and
a metallic sheet having a mating surface;
wherein the control device operably causes the first module of the joining unit to initially clean the mating surface and then subsequently weld the fastening element to the mating surface.

16. The joining system of claim 1, comprising:
a plurality of programming of the control device;
wherein the control device operably determines a compatibility of the joining unit with the programming of the control device.

17. The joining system of claim 1, further comprising:
a code operably allowing one of access to and disablement of the stored process software.

18. The joining system of claim 1, comprising:
a recognition procedure;
wherein the control device operably repeats the recognition procedure to determine mutual compatibility of at least the modules of the joining unit and the main unit at regular intervals.

19. An arc welding system, comprising:
a computerized control device; and
memory connected to the control device, the memory having stored therein at least the following computer program modules:
  first process software operable to control a first welding process; and
  second process software operable to control a second welding process different than that of the first welding process;
a plurality of process software each operable to conduct a joining operation for each of the first and second welding processes;
a plurality of welding process parameters defined for each of the first and second welding processes;
a plurality of parameter blocks each having at least one of the welding process parameters, each parameter block assignable to one of the first and second welding processes; and
a program operable to interrogate only selected ones of the plurality of welding process parameters and to prevent interrogation of remaining ones of the welding process parameters;
the control device automatically accessing the appropriate process software depending upon an equipment type connected to the welding system.

20. The arc welding system of claim 19, further comprising:
a plurality of fasteners; and
an arc welding module operably arc welding each of the fasteners to a workpiece;
wherein the control device operably actuates the arc welding module.

21. The arc welding system of claim 20, comprising:
an initial low current arc operably created by the arc welding module;
a high current welding arc operably created by the arc welding module; and
a lifting device included with the arc welding module;
wherein the lifting device operably moves each of the fasteners away from the workpiece after the initial low current arc is created and then moves each of the fasteners toward the workpiece after the high current welding arc is created.

22. The arc welding system of claim 19, comprising:
a plurality of steel first fastening elements wherein the first process software operably controls welding of the first fastening elements; and
a plurality of aluminium-based second fastening elements wherein the second process software operably controls welding of the second fastening elements.

23. The arc welding system of claim 19, comprising:
a plurality of first fastening elements having a first shape, wherein the first process software operably controls welding of the first fastening elements; and
a plurality of second fastening elements having a second shape different from the first shape, wherein the second process software operably controls welding of the second fastening elements.

24. The arc welding system of claim 19, further comprising:

a random access memory accessible by the control device;
an operator terminal connected to the control device, the operator terminal allowing manual operator control of the control device; and
the plurality of welding process parameters being stored in the random access memory.

25. The arc welding system of claim 19, further comprising:
a joining unit operably controlled by the control device; and
a plurality of programming of the control device;
wherein the control device operably determines compatibility of the joining unit with the programming of the control device.

26. The arc welding system of claim 19, comprising a code operably allowing one of access to and disablement of the stored first and second process software.

27. The arc welding system of claim 19, wherein the memory comprises a non-volatile flash memory having the software contained in a plurality of blocks.

28. A method of operating a joining system having a main controlling unit and a metal joining unit, the method comprising:
communicating between the main controlling unit and the joining unit using a plurality of process software;
recognizing a compatibility of at least a portion of the joining unit with the main controlling unit;
storing the plurality of process software in a memory of the main controlling unit;
defining a plurality of parameters in each of a plurality of parameter blocks divisible as a parameter block type for each of the plurality of process software; and
interrogating only a portion of the plurality of parameters, the portion defining only relevant ones of the parameters of a parameter block type for the process software while preventing interrogation of remaining non-portion ones of the parameters.

29. The method of claim 28, comprising:
feeding a metallic weld stud from a first module of the joining unit to a second module of the joining unit; and
creating an electrical arc for welding of the weld stud using the second module.

30. The method of claim 29, comprising:
querying as to whether the joining unit is compatible with any of a plurality of computer programs accessible by the main controlling unit; and
enabling at least one of the computer programs which controls welding if the joining unit is compatible with the queried computer program.

31. The method of claim 28, comprising accessing any one of the computer programs operable to control a welding process within a flash memory in communication with the main controlling unit.

32. The method of claim 28, comprising preventing repeated polling of parameters which are not contained in one of the parameter block types during programming of parameter blocks of the same type for successive welding operations within an overall process.

33. A method of operating an arc welding system having a controller and a plurality of machines associated with elements to be welded, the method comprising:
(a) transmitting a signal between the controller and at least one of the machines;
(b) ascertaining if a predetermined code is present;
(c) allowing implementation of a first computer program if the predetermined code is of a first type;
(d) implementing a second computer program if the predetermined code is of a second type; and
(e) energizing the machines for arc welding in response to the appropriate computer program implementation in the controller.

34. The method of claim 33, comprising:
feeding a metallic weld stud from a first of the machines to a second of the machines; and
creating an electrical arc for welding of the weld stud using the second of the machines.

35. The method of claim 33, comprising:
querying as to whether the machines are compatible with any of the computer programs; and
enabling at least one of the computer programs which controls weld processing if a corresponding one of the machines is compatible with the enabled computer program.

36. The method of claim 35, comprising:
selecting a parameter block type from a memory containing a plurality of welding parameters; and
interrogating only select ones of the parameters which are of relevance to the enabled computer program which controls weld processing.

37. The method of claim 33, comprising accessing one of the computer programs for controlling weld processing within a flash memory in communication with the controller.

38. The method of claim 33, comprising polling at least one of the computer programs at regular but delayed intervals.

* * * * *